March 18, 1969     F. Y. MILLER     3,432,908
PIPE ASSEMBLING AND DISASSEMBLING TOOL
Filed July 11, 1966     Sheet 2 of 2
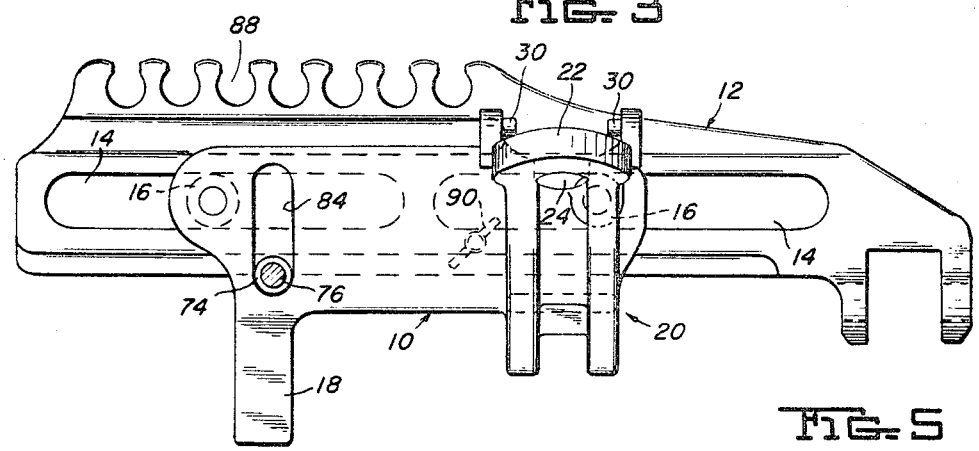
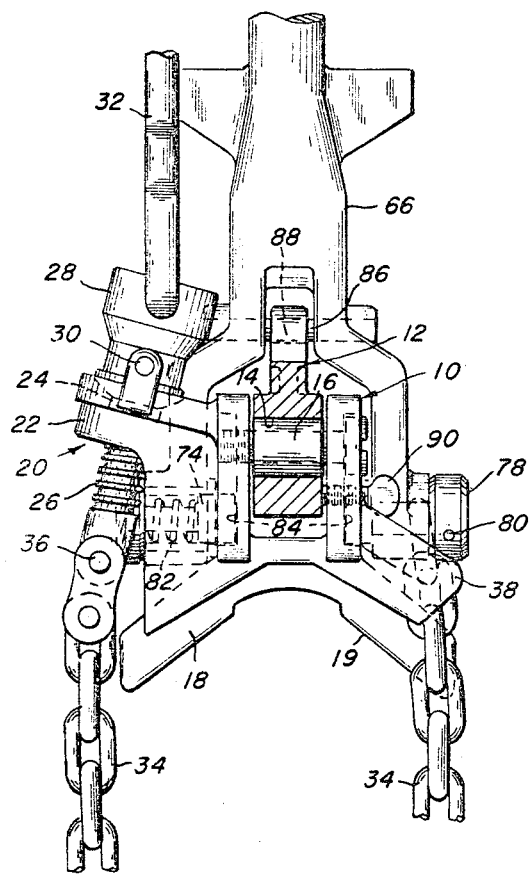
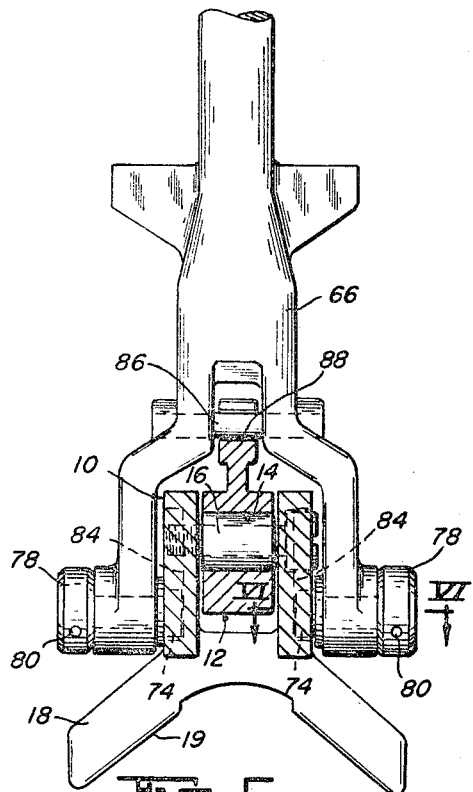
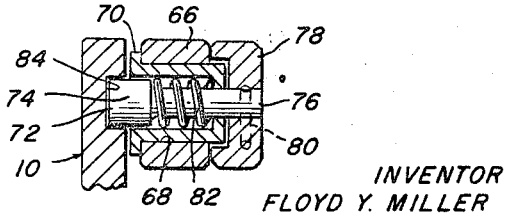
INVENTOR
FLOYD Y. MILLER
By J. D. Douglass
His Attorney United States Patent Office 3,432,908
Patented Mar. 18, 1969

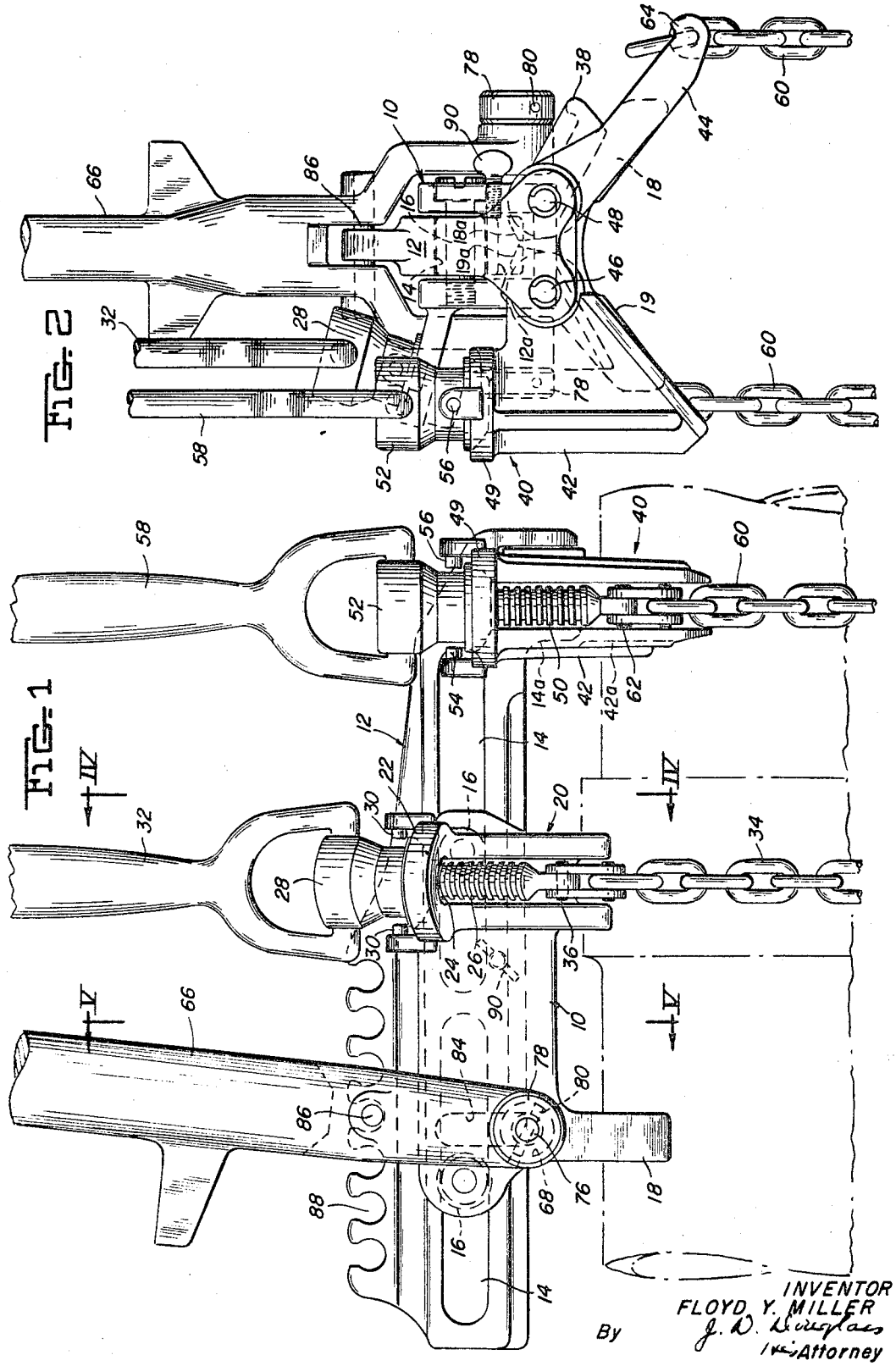

3,432,908
PIPE ASSEMBLING AND DISASSEMBLING TOOL
Floyd Y. Miller, Elyria, Ohio, assignor to Emerson Electric Co., St. Louis, Mo., a corporation of Missouri
Filed July 11, 1966, Ser. No. 564,138
U.S. Cl. 29—237
Int. Cl. B23p 19/04
9 Claims

ABSTRACT OF THE DISCLOSURE

A tool for assembling and disassembling soil pipe sections and the like. The tool is provided with a slot and the frame member includes a slide disposed in said slot whereby the frame and the slide member are mounted for relative longitudinal movement. The slide member is provided with a series of grooves, and a handle is mounted for slidable vertical movement and pivotal movement on the frame member. A pivot pin is provided in the handle member and is adapted to be selectively engaged in the grooves to move the slide and frame members relatively reciprocally with respect to each other. Both the slide member and the frame member have pipe engaging devices, one of which preferably includes pivoted arms for adapting the device for use for different size pipes. The pipe engaging devices include chains which wrap around the pipe and screws which will tighten the chain to firmly grip the pipe. Movement of the handle member pivotally in one direction will force the pipe members together when they are engaged by pipe engaging means and movement in the opposite direction will force them apart when engaged with the pipe engaging means. Preferably a set screw is threaded through the frame and adapted to screw down against the slide member to selectively prevent movement and maintain the members in a selected position.

---

This invention relates generally to pipe assembly tools and more particularly to adjustable chain type clamping tools for assembling and disassembling soil pipe sections.

In assembling cast iron soil pipe of the bell and spigot type, it is conventional practice to provide a ring of neoprene or the like in the bell and then force the spigot end of the next section of pipe, which has a slight flange on it, beyond the ring into the bell with the ring between the bell and spigot. Thus, it is necessary to provide a tool which will firmly grip the two sections of pipe to be joined and will force the two sections together with sufficient force to effect a seal. Also seals of existing pipe connections must often be broken and for this the same tool should be adapted to engage and pull the sections apart.

There have been many prior art proposals for such pipe assembling and disassembling tools. Some of these tools have used fixed clamps or jaws to grip the pipes; however, this limits the size range of pipes which can be accommodated by a single tool, necessitating an inventory of several different sizes of tools. Also, some prior art proposals have utilized various chain configurations. These have usually required resetting of the chains during operation to complete the assembling or disassembling of the pipe sections and they have normally required skillful manipulation of the chain and actuating device for effective operation of the tool. Also, many tools of this type have embodied ratchet and pawl arrangements for exerting force, which arrangements are expensive and subject to maintenance problems.

The present invention contemplates an improved pipe assembling and disassembling tool which incorporates pivoted arms and a chain arrangement for engaging the pipe sections in such a way that a single tool can be used for assembling and disassembling pipe sections of a wide range of sizes. The tool of this invention also incorporates a force applying mechanism that is of a simple, inexpensive construction and which permits the assembly or disassembly of the pipe sections without resetting the chains at any point during the operation.

Still other advantages of the invention and the invention itself will become more apparent from the following description of an embodiment thereof, which description is illustrated by the accompanying drawings and forms a part of this specification.

In the drawings:

FIG. 1 is a side elevational view of a pipe assembly and disassembly tool according to this invention;

FIG. 2 is an end elevational view of the device of FIG. 1;

FIG. 3 is a detailed view of the frame and slide members in assembled relationship;

FIG. 4 is a sectional view taken substantially along a plane designated by line IV—IV of FIG. 1;

FIG. 5 is a sectional view taken substantially along the plane designated by the line V—V of FIG. 1; and FIG. 6 is a sectional view taken substantially aong the line VI—VI of FIG. 5, showing the pin assembly mounting the handle on the slide.

Briefly, the tool of this invention includes a frame member having a chain type clamp device adapted to grip the bell end of a pipe section and a slide member slidably mounted on the frame member having a second chain gripping device adapted to grip the spigot end of a second pipe section. Although the term "spigot" is used, it should be understood that when a gasket or ring type of seal is used the end of the pipe which goes into the bell may be plain and not be a true spigot as known in the art. The chain gripping device of the slide member includes a pair of pivoted arms which will permit adjustment so that the second gripping device will maintain the alignment of the bell and spigot ends while the pipe sections are being forced together or apart. The tool also includes a rack and lever type of drive mechanism which causes the slide member and frame member to slide relative to each other to effect the pipe assembly or disassembly while the chain clamps are secured to the bell and spigot ends of the pipe sections being joined.

More specifically, referring to the drawings, the pipe assembly tool is shown engaging two pipe sections in position for joining them. The tool comprises a frame member 10 which is bifurcated to provide two spaced parallel frame parts. A slide member 12 is mounted between the frame parts and is provided with two elongated slots 14 through which a pair of rollers 16 extend, the rollers being secured between frame parts, to slidably mount the slide member 12 in the frame 10.

The frame member 10 has a pipe engaging support member 18 extending down from one end having angularly disposed surfaces 19 for engagement with and resting on the straight part of the body portion of a pipe. It also is provided with a chain type clamping means, designated generally as 20, which includes a flange 22 having a central bore 24 through which a screw 26 extends (FIGS. 1 and 3). The screw 26 is threadably engaged with a cap 28 which is seated on the flange 22, the two parts having sem-spherical mating surfaces to provide a swivel joint. The cap 28 is retained in the seat by a pair of restraining pins 30 (FIG. 1). A handle 32 is swingably connected to the cap and extends from the cap 28 for rotation of the cap to move the screw 26 up and down. A chain 34 is pivotally connected to the end of the screw 26 by a pin and link 36 and is disposed to be wrapped about the bell end of the pipe and engage a chain hook 38 formed on the opposite side of the housing 10. To secure the chain 34 around the bell end of a pipe section the chain is looped around the bell and engaged with the chain hook 38. The handle 32 is then rotated to tighten the chain and securely fasten the frame to the pipe.

The slide member 12 is also provided with a chain clamping device, designated generally as 40, which is adapted to grip the spigot end of an adjacent pipe section being assembled or disassembled. It includes a pair of pivoted arms 42 and 44 pivotally connected to opposite sides of the slide member 12 by pivot pins 46 and 48, respectively. The pivot arm 42 is provided with a top flange 49 having a through bore (not shown). A screw 50 extends through the bore and is threadably engaged by a cap 52. The cap 52 is seated on the flange 49, the two parts having semi-spherical mating surfaces to provide a swivel joint. The cap 52 is retained in the seat by a pair of retaining pins 54 and 56. A handle 58 swingably connected to the cap extends from the cap 52 for rotating the cap to move the screw 50 up and down. A chain 60 is pivotally connected to the screw 50 by a pin and link 62. The chain 60 is disposed to be wrapped about the spigot end of a pipe section and engaged with a hook 64 formed on the end of the arm 44. The chain 60 may be looped around the pipe engaged with the hook 64 and tightened by turning the handle 58.

To move the slide member and frame member relative to each other, a rack-type drive arrangement is provided. The drive arrangement includes a forked handle 66 which straddles both the frame 10 and the slide 12. As can best be seen in FIG. 6, each of the legs of the forked portion of the handle 66 has a through bore 68 which seats a bushing 70. A groove engaging stud 72 is disposed in each bushing 70, having an enlarged head 74 and a stem 76. A cap 78 is secured to each stem 76 by a pin 80. A spring 82 is disposed in each bushing 70 surrounding the stems 76 and urging the heads 74 into vertical slots 84 formed on the frame member 10 (FIG. 3). A pin 86 extends across the legs of the forked portion of the handle 66 and is disposed to engage rack-type grooves 88 formed at the top of the slide member 12.

A wing-head screw 90 is threadably engaged in the side of the frame 10 and is adapted to engage the slide 12 to retain it in place.

Turning now to the operation of the device, it is used in the following manner to assembly sections of pipe. The wing screw 90 is loosened and the handle 66 is raised in the slots 84 until the pin 86 is clear of the slots 88. The slide member 12 is then pushed to the right, as seen in FIG. 1, to move the pipe clamping devices 20 and 40 to their most widely spaced positions. If the device is being used in a vertical position, the wing screw 90 is tightened to retain the slide in position while it is being secured. The angular surfaces 19 of the pipe engaging member 18 are then placed upon the body section of a pipe, as shown in FIG. 1, and the chain 34 of the clamping device 20 is looped around the bell and engaged with the hook 38. The handle 32 is then rotated to bring the chain 34 tightly against the pipe and pull the pipe against the frame member 10, which will securely grip or clamp the bell section of the pipe. The pivoted arms 42 and 44 of the pipe clamp 40 will then naturally swing down and come into engagement with the spigot end of the adjacent pipe section.

The two arms 42-44 are prevented from swinging too close together by the abutments 18a-19a which engage with the surface 12a as they swing toward each other. This holds the arms spread apart so that they can engage the pipe and be swung apart according to the diameter of the pipe. Two points of contact of the clamping device 40 on the spigot end of the pipe are provided, i.e., one point on each of the pivoted arms 42 and 44. The chain 60 is then looped around the pipe and engaged in the hook 64. The handle 58 is then turned to pull the chain up tight. The force exerted by the chain 60 acts in two ways on the pivoted arms 42 and 44. The chain 60 exerts an upward force on the pipe against the arms 42 and 44, which tends to force the arms apart. However, the chain 60 is looped around the pipe and the force exerted by the chain directly on arms 42 and 44 tends to squeeze the arms 42 and 44 together, opposing the spreading force on the arms caused by the upward movement of the pipe section. Thus, the arms 42 and 44 are prevented from spreading under the upward urging of the pipe by the pulling action of the chains on the arms and also the arms are prevented from being squeezed together under the urging of the chain on the arms by the action of the upward force of the pipe. It will be noticed, as can best be seen by comparing FIGS. 1 and 2, that the pivots for the arms 42–44 are so disposed that, when the pipe is clamped by the arms and chain, the engagement is offset toward the axis of the pipe from that of the pipe engaging surface on the clamp 20 by approximately the amount of enlargement of the bell over the body part of the pipe. Hence, the forces caused by the tightening of the chain 60 cause a tight clamping action of the pipe against the arms 42 and 44 in their naturally contacting position with the pipe and maintain the pipe sections in axial alignment as they are being forced toward each other during the assembly operation. It is the incorporation of the pivoting arms 42 and 44 in the chain clamping device 40 and the positioning of their pipe engaging surfaces which allows the tool to be utilized for a wide range of pipe sizes.

When the two sections of pipe have been securely gripped by the clamping devices 20 and 40, the wing screw 90 is loosened which frees the slide from the frame. The handle 66 is then dropped down to allow the pin 86 to enter into one of the slots 88. The handle 66 is then pulled to the left, as viewed in FIG. 1 tending to rotate it counterclockwise about the pin 86, which will cause the slide member 12 to move to the left with respect to the frame member, urging the clamping devices 20 and 40 toward each other. This forces the spigot end of the one pipe section into the bell end of the other pipe section. The greatest amount of leverage is obtained from the handle when the pin 86 is directly above the studs 72 and thus, as the slide member 12 moves, the handle can be raised and the pin progressively engaged with each of the next slots to maintain the highest obtainable leverage. This motion of the slide member 12 is continued until a firm seating engagement of the spigot end of the pipe section in the bell end of another pipe section has been accomplished. It will be noted that the surfaces of the arms 42 and 44, facing the bell end of the adjacent pipe, have offset portions 42a facing the bell. This allows the pipe gripping part to move over close to or over the edge of the bell when the clamp means 40 is moved close to the end of the frame 10 and prevents the jaw parts from engaging with the gasket or seal which may project beyond the edge of the bell. After the assembly is made, the clamping devices 20 and 40 are disengaged from the pipe sections by loosening the handles 32 and 58 and disengaging the chains 34 and 60 from the hooks 38 and 64. The tool is then removed and the pipes are joined together in a tight seal.

In order to use this tool to loosen a pipe coupling, the wing screw 90 is loosened and the slide 12 moved on the frame 10 to move the clamping means 20 and 40 close together. The chains are then secured around the bell and spigot ends of the pipe sections as described previously. The handle 66 is then pulled to the right, as seen in FIG. 1, and the device is operated to separate the pipe sections.

When the tool is not in use, the handle 66 can be easily removed for storage by merely pulling the studs 72 against the bias of the springs 82 to retract them from the slots 84 and then lifting off the handle. It can be replaced in the same manner.

Although the invention has been described particularly as used for the assembly of straight pipe sections it will be apparent that it is also useful in the assembly of the other types of pipe sections such as T's, elbows etc., and is not limited in its use.

I claim:
1. A tool for assembling and disassembling pipe sections comprising, a frame member having first pipe engaging means secured thereto, a slide member slidably mounted on said frame member having second pipe engaging means secured thereto, each of said pipe engaging means including chain means disposed to be looped about a section of pipe and tensioning means to tighten said chain means about the pipe, at least one of said pipe engaging means including first and second pivotally mounted arms, each disposed to engage said pipe and to secure said chain means, and means operatively interconnecting said frame member and said slide member disposed to cause relative movement between said frame member and said slide member to move said pipe engaging means toward and away from each other selectively.

2. The combination as described in claim 1, wherein said arms are provided with inwardly facing pipe engaging surfaces, and means is provided on said arms for holding the arms in a partially spread position with their pipe engaging surfaces ready for engagement with a pipe.

3. The combination as described in claim 1, wherein said first pipe engaging means on said frame includes a pair of diverging pipe engaging surfaces for engagement with a part of a pipe of one diameter and said pivots for said arms are positioned relative to the axes of the pipes to place the pipe engaging parts in a position radially inward of the first pipe engaging means by a distance approximately equal to one-half the difference in diameter of the part of the pipe of larger diameter and that of a pipe part of smaller diameter.

4. The combination as described in claim 3, wherein said pivot arms are formed with offset portions at the places opposite to the pipe part of larger diameter, extending beyond the periphery of the pipe of larger diameter.

5. A tool for assembling and disassembling pipe sections comprising, a frame member having first pipe engaging means secured thereto, a slide member mounted on said frame member having second pipe engaging means secured thereto, each of said pipe engaging means including chain means disposed to be looped about a section of pipe and tensioning means to tighten said chain means about the pipe, said slide member and said frame member including inter-engaging means to guide said frame member and said slide member for longitudinal relative movement, means to move said slide member and said frame member in both directions of said longitudinal movement, said last named means including a plurality of slots formed in said slide member, a lever pivotally mounted on said frame member, pivot pin means carried by said lever, means to selectively position said pivot pin means in said slots and pivotally engage the wall of the selected slot, whereby pivotal movement of the lever in one direction will cause said pipe engaging means to be moved toward each other and pivotal movement in the opposite direction will cause said pipe engaging means to be moved away from each other.

6. The combination of claim 5 further characterized by means detachably securing said lever means to said frame member of facile removal thereof.

7. The combination of claim 6, wherein said means detachably securing said lever to said frame member includes slot means in said frame member and lug means carried by said lever member biased into said slot means.

8. The combination of claim 5 wherein said lever is slidably mounted in guide slot means in said frame member.

9. A tool for assemblying and disassemblying pipe sections comprising, a frame member having first pipe engaging means secured thereto, a slide member, means slidably mounting said slide member on said frame member for movement along the longitudinal axis of said tool, said slide member having second pipe engaging means secured thereto, said slide member including an elongated slot and said frame member including slide means extending laterally into said slot, each of said pipe engaging means including chain means disposed to be looped about a section of pipe and tensioning means to tighten said chain means about the pipe, and means operatively interconnecting said frame member and said slide member disposed to cause relative movement between said frame member and said slide member to move said pipe engaging means toward and away from each other selectively.

References Cited
UNITED STATES PATENTS

| | | | |
|---|---|---|---|
| 1,894,835 | 1/1933 | Smith et al. | 29—234 |
| 1,927,688 | 9/1933 | McKee | 29—237 |
| 2,691,211 | 10/1954 | Leiber | 29—237 |
| 3,270,406 | 9/1966 | Gorman et al. | 29—237 |
| 3,182,388 | 5/1965 | Hart et al. | |

LESTER M. SWINGLE, *Primary Examiner.*

J. C. PETERS, *Assistant Examiner.*